(12) United States Patent
Hu et al.

(10) Patent No.: US 12,078,897 B2
(45) Date of Patent: Sep. 3, 2024

(54) DISPLAY PANEL AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Jinliang Hu, Beijing (CN); Chengyong Zhan, Beijing (CN); Jian Ma, Beijing (CN); Jingsen Li, Beijing (CN); Ran Zhang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/263,555

(22) PCT Filed: Jul. 27, 2022

(86) PCT No.: PCT/CN2022/108275
§ 371 (c)(1),
(2) Date: Jul. 31, 2023

(87) PCT Pub. No.: WO2024/020861
PCT Pub. Date: Feb. 1, 2024

(65) Prior Publication Data
US 2024/0219783 A1 Jul. 4, 2024

(51) Int. Cl.
G02F 1/1362 (2006.01)
G06F 3/041 (2006.01)

(52) U.S. Cl.
CPC .. *G02F 1/136204* (2013.01); *G02F 1/136222* (2021.01); *G02F 1/136286* (2013.01); *G06F 3/0412* (2013.01)

(58) Field of Classification Search
CPC ......... G02F 1/136204; G02F 1/136222; G02F 1/136286; G06F 3/0412
See application file for complete search history.

(56) References Cited

U.S. PATENT DOCUMENTS

| 11,596,062 B2 | 2/2023 | Wang et al. |
| 2007/0091230 A1* | 4/2007 | Ouderkirk ........... G02F 1/13362 349/96 |

(Continued)

FOREIGN PATENT DOCUMENTS

| CN | 105468204 A | 4/2016 |
| CN | 107367863 A | 11/2017 |

(Continued)

OTHER PUBLICATIONS

CN 110568655 machine translation (Year: 2019).*

*Primary Examiner* — James A Dudek
(74) *Attorney, Agent, or Firm* — Westman, Champlin & Koehler, P.A.

(57) ABSTRACT

The display panel includes: a display substrate, wherein the display substrate includes a color film substrate and an array substrate, a surface of the color film substrate away from the array substrate is provided with a color film polarizer, at least two preset points are provided on the display substrate, the at least two preset points are electrically connected to the color film polarizer, and the at least two preset points are electrically connected to the driving circuit, so as to form at least one first anti-static ring; and at least one grounding line, wherein the at least one grounding line is electrically connected to the array substrate, and electrically connected to the driving circuit, so as to form at least one second anti-static ring surrounding the display substrate. A display device is also provided.

20 Claims, 7 Drawing Sheets

(56) References Cited

U.S. PATENT DOCUMENTS

| | | |
|---|---|---|
| 2008/0180591 A1 | 7/2008 | Shie |
| 2016/0027372 A1 | 1/2016 | Yan |
| 2018/0095324 A1 | 4/2018 | Li et al. |
| 2019/0041681 A1* | 2/2019 | Lai ...................... H01L 23/4985 |
| 2022/0028308 A1 | 1/2022 | Yang et al. |
| 2022/0104348 A1 | 3/2022 | Wang et al. |

FOREIGN PATENT DOCUMENTS

| | | |
|---|---|---|
| CN | 108170317 A | 6/2018 |
| CN | 110568655 A | 12/2019 |
| CN | 213276203 U | 5/2021 |
| CN | 114333615 A | 4/2022 |
| JP | 2009229521 A | 10/2009 |
| JP | 2018116243 A | 7/2018 |

* cited by examiner

DISPLAY PANEL AND DISPLAY DEVICE

CROSS-REFERENCE TO RELATED APPLICATION

This application is a Section 371 National Stage Application of International Application No. PCT/CN2022/108275, filed on Jul. 27, 2022, entitled "DISPLAY PANEL AND DISPLAY DEVICE", the content of which is hereby incorporated by reference in its entirety.

TECHNICAL FIELD

The present disclosure relates to a field of display technology, and in particular, to a display panel and a display device.

BACKGROUND

Usually, based on, for example, anti-static requirements of a liquid crystal display, an indium tin oxide (ITO) thin film is coated on a back of a color film substrate of a display panel as a conductive layer, which conducts surface charges through an ITO layer to avoid charge accumulation, which forms poor electro-static discharging, during a process of manufacturing the display panel. This type of poor electro-static discharging may lead to a phenomenon of uneven image quality in a display region of the display panel during a display process, that is a phenomenon of Electro-Static Discharge Mura (ESD Mura).

However, for displays with touch functions built in by Touch and Display Driving Integration (TDDI) technology, the conductive layer ITO will shield a touch signal, resulting in insufficient touch signal quantity, thereby causing poor touch control issues.

SUMMARY

The present disclosure provides a display panel and a display device.

According to a first aspect, the present disclosure provides a display panel, wherein the display panel is electrically connected to a driving circuit, the driving circuit is configured to drive the display panel, and the display panel includes: a display substrate, wherein the display substrate includes a color film substrate and an array substrate, a surface of the color film substrate away from the array substrate is provided with a color film polarizer, at least two preset points are provided on the display substrate, the at least two preset points are electrically connected to the color film polarizer, and the at least two preset points are electrically connected to the driving circuit, so as to form at least one first anti-static ring; and at least one grounding line, wherein the at least one grounding line is electrically connected to the array substrate, and electrically connected to the driving circuit, so as to form at least one second anti-static ring surrounding the display substrate.

For example, the display panel further includes at least two connecting lines, wherein the at least two preset points are respectively electrically connected to the driving circuit through the at least two connecting lines.

For example, the array substrate includes a gate layer, and the at least two connecting lines are disposed in the gate layer.

For example, the array substrate includes a source layer, and the at least two connecting lines are disposed in the source layer.

For example, the at least one grounding line includes a grounding line, the array substrate includes a gate layer, and the grounding line is disposed in the gate layer.

For example, the at least one grounding line includes a grounding line, the array substrate includes a source layer, and the grounding line is disposed in the source layer.

For example, the at least one grounding line includes two grounding lines, the array substrate includes a gate layer and a source layer, and the two grounding lines are respectively disposed in the gate layer and the source layer.

For example, the driving circuit includes a plurality of connecting ends, the at least two preset points are electrically connected to at least two connecting ends of the plurality of connecting ends, and the at least one grounding line is electrically connected to at least two connecting ends of the plurality of connecting ends.

For example, the at least two connecting ends include a first connecting end and a second connecting end, the at least one grounding line includes a first grounding line, the first grounding line includes a first end and a second end, the at least two connecting lines include a first connecting line and a second connecting line, and the array substrate includes a gate layer; the first connecting line and the second connecting line are disposed in the gate layer, the first connecting line is electrically connected to the first connecting end, and the second connecting line is electrically connected to the second connecting end, so as to form a first anti-static ring, the first grounding line is disposed in the gate layer, the first end is electrically connected to the first connecting end, and the second end is electrically connected to the second connecting end, so as to form a second anti-static ring.

For example, the at least one grounding line further includes a second grounding line, the second grounding line includes a third end and a fourth end, and the array substrate further includes a source layer; the second grounding line is disposed in the source layer, the third end is electrically connected to the first connecting end, and the fourth end is electrically connected to the second connecting end, so as to form the second anti-static ring.

For example, the at least two connecting ends include a first connecting end, a second connecting end, a third connecting end and a fourth connecting end, the at least one grounding line includes a first grounding line, the first grounding line includes a first end and a second end, the two connecting lines include a first connecting line and a second connecting line, and the array substrate includes a gate layer; the first connecting line and the second connecting line are disposed in the gate layer, the first connecting line is electrically connected to the first connecting end, and the second connecting line is electrically connected to the second connecting end, so as to form a first anti-static ring, the first grounding line is disposed in the gate layer, the first end is electrically connected to the third connecting end, and the second end is electrically connected to the fourth connecting end, so as to form a second anti-static ring.

For example, the at least two connecting ends further include a fifth connecting end and a sixth connecting end, the at least one grounding line further includes a second grounding line, the second grounding line includes a third end and a fourth end, and the array substrate further includes a source layer; the second grounding line is disposed in the source layer, the third end is electrically connected to the fifth connecting end, and the fourth end is electrically connected to the sixth connecting end, so as to form the second anti-static ring.

For example, the at least two connecting ends include a first connecting end and a second connecting end, the at least one grounding line includes a first grounding line, the first grounding line includes a first end and a second end, the at least two connecting lines include a first connecting line and a second connecting line, and the array substrate includes a gate layer and a source layer; the first connecting line and the second connecting line are disposed in the source layer, the first connecting line is electrically connected to the first connecting end, and the second connecting line is electrically connected to the second connecting end, so as to form a first anti-static ring, the first grounding line is disposed in the gate layer, the first end is electrically connected to the first connecting end, and the second end is electrically connected to the second connecting end, so as to form a second anti-static ring.

For example, the at least two connecting ends further include a third connecting end and a fourth connecting end, the at least one grounding line further includes a second grounding line, the second grounding line includes a third end and a fourth end, and the array substrate further includes a source layer; the second grounding line is disposed in the source layer, the third end is electrically connected to the third connecting end, and the fourth end is electrically connected to the fourth connecting end, so as to form the second anti-static ring.

For example, the at least two connecting ends include a first connecting end and a second connecting end, the at least one grounding line includes a first grounding line, the first grounding line includes a first end and a second end, the at least two connecting lines include a first connecting line and a second connecting line, and the array substrate includes a source layer; the first connecting line and the second connecting line are disposed in the source layer, the first connecting line is electrically connected to the first connecting end, and the second connecting line is electrically connected to the second connecting end, so as to form a first anti-static ring, the first grounding line is disposed in the source layer, the first end is electrically connected to the first connecting end, and the second end is electrically connected to the second connecting end, so as to form a second anti-static ring.

For example, the at least one grounding line further includes a second grounding line, the second grounding line includes a third end and a fourth end, and the array substrate further includes a gate layer; the second grounding line is disposed in the gate layer, the third end is electrically connected to the first connecting end, and the fourth end is electrically connected to the second connecting end, so as to form the second anti-static ring.

For example, the at least two connecting ends include a first connecting end, a second connecting end, a third connecting end and a fourth connecting end, the at least one grounding line includes a first grounding line, the first grounding line includes a first end and a second end, the at least two connecting lines include a first connecting line and a second connecting line, and the array substrate includes a source layer; the first connecting line and the second connecting line are disposed in the source layer, the first connecting line is electrically connected to the first connecting end, and the second connecting line is electrically connected to the second connecting end, so as to form a first anti-static ring, the first grounding line is disposed in the source layer, the first end is electrically connected to the third connecting end, and the second end is electrically connected to the fourth connecting end, so as to form a second anti-static ring.

For example, the at least two connecting ends further include a fifth connecting end and a sixth connecting end, the at least one grounding line further includes a second grounding line, the second grounding line includes a third end and a fourth end, and the array substrate further includes a gate layer; the second grounding line is disposed in the gate layer, the third end is electrically connected to the fifth connecting end, and the fourth end is electrically connected to the sixth connecting end, so as to form the second anti-static ring.

For example, the at least two connecting ends include a first connecting end and a second connecting end, the at least one grounding line includes a first grounding line, the first grounding line includes a first end and a second end, the at least two connecting lines include a first connecting line and a second connecting line, and the array substrate includes a gate layer and a source layer; the first connecting line and the second connecting line are disposed in the gate layer, the first connecting line is electrically connected to the first connecting end, and the second connecting line is electrically connected to the second connecting end, so as to form a first anti-static ring, the first grounding line is disposed in the source layer, the first end is electrically connected to the first connecting end, and the second end is electrically connected to the second connecting end, so as to form a second anti-static ring.

For example, the at least two connecting ends further include a third connecting end and a fourth connecting end, the at least one grounding line further includes a second grounding line, the second grounding line includes a third end and a fourth end, and the array substrate further includes a gate layer; the second grounding line is disposed in the gate layer, the third end is electrically connected to the third connecting end, and the fourth end is electrically connected to the fourth connecting end, so as to form the second anti-static ring.

For example, the at least two connecting ends include a first connecting end, a second connecting end, a third connecting end and a fourth connecting end, the at least one grounding line includes a first grounding line, the first grounding line includes a first end and a second end, the at least two connecting lines include a first connecting line and a second connecting line, and the array substrate includes a gate layer and a source layer; the first connecting line and the second connecting line are disposed in the source layer, the first connecting line is electrically connected to the first connecting end, and the second connecting line is electrically connected to the second connecting end, so as to form a first anti-static ring, the first grounding line is disposed in the gate layer, the first end is electrically connected to the third connecting end, and the second end is electrically connected to the fourth connecting end, so as to form a second anti-static ring.

For example, the at least two connecting ends include a first connecting end, a second connecting end, a third connecting end and a fourth connecting end, the at least one grounding line includes a first grounding line, the first grounding line includes a first end and a second end, the at least two connecting lines include a first connecting line and a second connecting line, and the array substrate includes a gate layer and a source layer; the first connecting line and the second connecting line are disposed in the gate layer, the first connecting line is electrically connected to the first connecting end, and the second connecting line is electrically connected to the second connecting end, so as to form a first anti-static ring, the first grounding line is disposed in the source layer, the first end is electrically connected to the third connecting end, and the second end is electrically connected to the fourth connecting end, so as to form a second anti-static ring.

For example, the first connecting end includes at least one connecting end, and the second connecting end includes at least one connecting end.

For example, the third connecting end includes at least one connecting end, and the fourth connecting end includes at least one connecting end.

For example, the fifth connecting end includes at least one connecting end, and the sixth connecting end includes at least one connecting end.

For example, the at least two preset points are electrically connected to the color film polarizer through a conductive adhesive.

For example, the conductive adhesive includes a silver adhesive.

For example, the display substrate includes a display region and a non-display region; the at least two preset points are disposed in the non-display region, and the at least two preset points are respectively electrically connected to the driving circuit in the non-display region; and the at least one grounding line is electrically connected to the display substrate in the non-display region, so as to form at least one second anti-static ring surrounding the display region.

For example, the at least two preset points are located on a first side of the non-display region, and the first side is close to the driving circuit.

For example, the at least two preset points include at least one first preset point and at least one second preset point, the at least one first preset point is located on a first side of the non-display region, the at least one second preset point is located on a second side of the non-display region opposite to the first side of the non-display region, the first side is close to the driving circuit, and the second side is away from the driving circuit.

For example, the display panel is a touch display panel, including a touch electrode disposed between the array substrate and the color film substrate.

According to a second aspect, the present disclosure provides a display device, including a display panel of an embodiment of the present disclosure; and a driving circuit, wherein the display panel is electrically connected to the driving circuit.

DETAILED DESCRIPTION OF EMBODIMENTS

Figure 1:
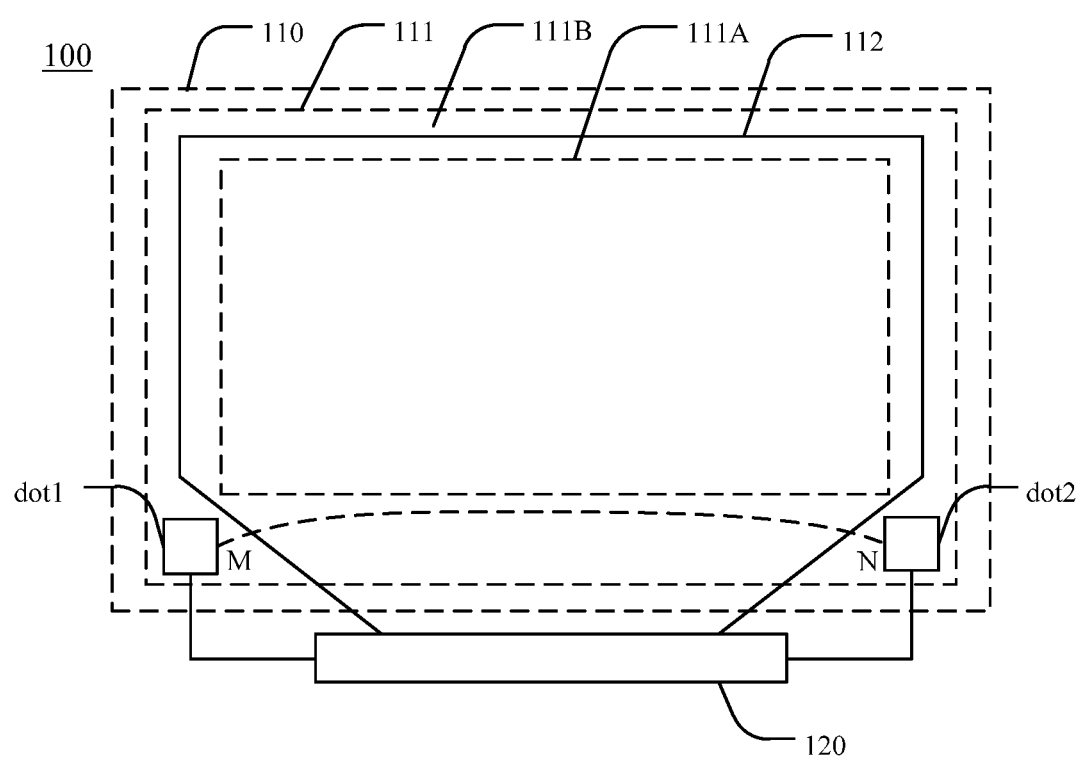
FIG. 1 shows a schematic diagram of a structure of a display device according to an embodiment of the present disclosure.

In order to make purposes, technical solutions, and advantages of embodiments of the present disclosure clearer, technical solutions in some embodiments of the present disclosure will be described clearly and completely in combination with accompanying drawings. Obviously, the described embodiments are only part of the embodiments of the present disclosure, not all of them. Based on the embodiments of the present disclosure provided, all other embodiments obtained by those of ordinary skilled in the art without creative labor, fall within scope of protection of the present disclosure. It should be noted that throughout the drawings, same elements are represented by same or similar reference signs. In the following description, some specific embodiments are only for descriptive purposes and should not be understood as limiting the present disclosure, but rather as examples of the embodiments of the present disclosure. When it may cause confusion in understanding of the present disclosure, conventional structures or configurations will be omitted. It should be noted that a shape and size of each component in the drawings do not reflect the true size and proportion, but only represent contents of the embodiments of the present disclosure.

Unless otherwise defined, the technical or scientific terms used in the embodiments of the present disclosure shall have the usual meaning understood by those of ordinary skilled in the art. The terms "first", "second", and similar terms used in the embodiments of the present disclosure do not indicate any order, quantity, or importance, but are only used to distinguish different components.

In addition, in description of the embodiments of the present disclosure, the terms "connected" or "electrically connected to" may refer to two components being directly electrically connected to each other, or may refer to two components being connected to each other through one or more other components. In addition, these two components may be connected or coupled in a wired or wireless way.

With a development of display technology, an application range of liquid crystal display devices is expanded, and more and more display devices may be used in cars as instrument panels, central control, entertainment displays, and so on. The common polarizers configured for on-board display devices are high resistance polarizers, which may not meet requirements of electro-static discharging of surface. Therefore, a conductive layer ITO may be coated on a back of a color film substrate to prevent uneven electro-static discharging. For car mounted display devices equipped with touch function, the configured polarizer is a low resistance polarizer. Compared to high resistance polarizers, low resistance polarizers have improved an ability to discharge electro-static, but still may not meet the requirements of electro-static discharging of surface. In addition, for touch display devices, in order to ensure a sensitivity of touch performance, a conductive layer ITO may not be coated on the back of the color film substrate. In a case that surface charges may not be transmitted through the conductive layer ITO as a channel, the accumulated charges may enter an interior of a display through a display panel, which causes a phenomenon of uneven image quality in a display region.

The present disclosure provides a display panel that may prevent static electricity. The display panel is electrically connected to a driving circuit, and the driving circuit is configured to drive the display panel. The display panel includes: a display substrate and at least one grounding line. The display substrate includes a color film substrate and an array substrate. A surface of the color film substrate away from the array substrate is provided with a color film polarizer, the display substrate is provided with at least two preset points, which are electrically connected to the color film polarizer, and at least two preset points are electrically connected to the driving circuit, so as to form at least one first anti-static ring. At least one grounding line is electrically connected to the array substrate, and electrically connected to the driving circuit, so as to form at least one second anti-static ring surrounding the display substrate.

FIG. 1 shows a schematic diagram of a structure of a display device according to an embodiment of the present disclosure.

As shown in FIG. 1, the display device 100 includes a display panel 110 and a driving circuit 120. The display panel 110 is electrically connected to the driving circuit 120, and the display panel 110 is driven by the driving circuit 120. The display panel 110 includes a display substrate 111 and at least one grounding line 112.

For example, the display substrate 111 may include a display region 111A and a non-display region 111B. The non-display region 111B is provided at least two preset points. FIG. 1 exemplarily shows only two preset points dot1 and dot2. The preset point dot1 may be disposed at point M of the non-display region 111B, and the preset point dot2 may be disposed at point N of the non-display region 111B. The display substrate 111 is respectively electrically connected to the driving circuit 120 through the preset point dot1 disposed at point M and the preset point dot2 disposed at point N, so that the driving circuit 120 is electrically connected to the two points on the display substrate 111, so as to form an anti-static ring R1. For example, a loop of the anti-static ring R1 may be the driving circuit 120→the preset point dot1→the preset point dot2→the driving circuit 120. The preset point dot1 and the preset point dot2 are electrically connected to each other through the display substrate 111.

In a case that at least two preset points include two preset points, the display substrate 111 is electrically connected to the driving circuit 120 through two preset points, so as to form an anti-static ring R1. In a case that at least two preset points include a plurality of preset points, the display substrate 111 may be electrically connected to the driving circuit 120 through any two of the plurality of preset points, so as to form a plurality of anti-static rings R1. A loop of each anti-static ring R1 may be the driving circuit 120→a first preset point→a second preset point→the driving circuit 120.

At least one grounding line 112 is disposed on the non-display region 111B of the display substrate 111. The display substrate 111 is electrically connected to the driving circuit 120 through at least one grounding line 112 in the non-display region 111B, and the driving circuit 120 is electrically connected to two ends of the grounding line, so as to form at least one anti-static ring R2 surrounding the display region 111A. In FIG. 1, only one grounding line is schematically shown. In a case that at least one grounding line includes one grounding line, the display substrate 111 is electrically connected to the driving circuit 120 through a grounding line in the non-display region 111B, so as to form an anti-static ring R2 surrounding the display region 111A. For example, a loop of the anti-static ring R2 may be considered as the driving circuit 120→the grounding line→the driving circuit 120. In a case that at least one grounding line includes a plurality of grounding lines, the display substrate 111 is respectively electrically connected to the driving circuit 120 in the non-display region 111B through the plurality of grounding lines, so as to form a plurality of anti-static rings R2 surrounding the display region 111A. For example, a loop of each anti-static ring R2 may be the driving circuit 120→one of the plurality of grounding lines→the driving circuit 120.

The anti-static rings R1 and R2 are both independent closed anti-static rings on the display substrate 111, and the anti-static rings R1 and R2 are not connected to parts of the anti-static rings R1 and R2 located in the display substrate. The independent anti-static rings may more effectively prevent charges from entering interior of the display panel, and are more conducive to electro-static discharging from different parts. The anti-static ring R2 may prevent charges from entering interior of the display panel. The anti-static ring R1 conducts and discharges charges of surface by using the preset points disposed on the display substrate, so as to prevent static electricity from entering the anti-static ring R2.

In a case that at least one anti-static ring R1 includes a plurality of anti-static rings R1, the plurality of anti-static rings R1 are not connected to each other. In a case that at least one second anti-static ring includes a plurality of second anti-static rings, the plurality of second anti-static rings are not connected to each other.

Figure 2A:
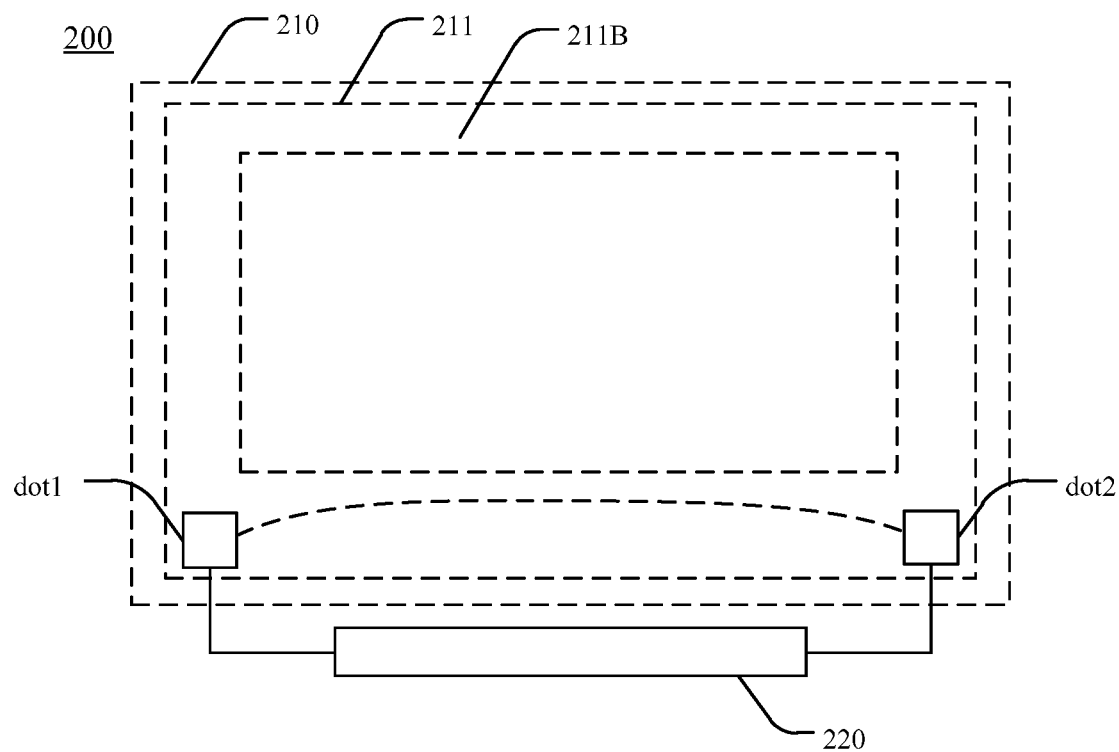
FIG. 2A shows a schematic diagram of a structure of a display device according to another embodiment of the present disclosure.
Figure 2B:
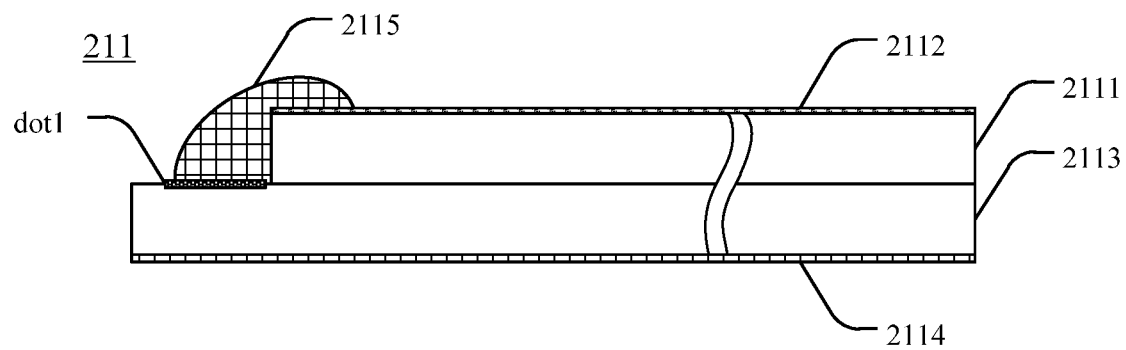
FIG. 2B shows a schematic diagram of the structure of the display substrate in FIG. 2A.

FIG. 2A shows a schematic diagram of a structure of a display device according to another embodiment of the present disclosure. FIG. 2B shows a schematic diagram of the structure of the display substrate in FIG. 2A.

As shown in FIG. 2A, the display device 200 includes a display panel 210 electrically connected to a driving circuit 220, which is configured to drive the display panel 210. The display panel 210 includes a display substrate 211. At least two preset points may be provided on a non-display region 211B of the display substrate 211. FIG. 2A exemplarily shows only a preset point dot1 and a preset point dot2. The display substrate 211 is respectively electrically connected to the driving circuit 220 through the preset point dot1 and the preset point dot2, so that the driving circuit 220 is electrically connected to two points on the display substrate 211, so as to form an anti-static ring R1.

As shown in FIG. 2B, the display substrate 211 includes a color film substrate 2111, a color film polarizer 2112, an array substrate 2113 and an array polarizer 2114. The color film polarizer 2112 is disposed on a surface of the color film substrate 2111 away from the array substrate 2113, and an array polarizer 2114 is disposed on a surface of the array substrate 2113 away from the color film substrate 2111. The preset point dot1 shown in FIG. 2A may be disposed at a position away from the array polarizer 2114 in the array substrate 2113. At the preset point dot1, the preset point dot1 is electrically connected to the color film polarizer 2112 through a conductive adhesive 2115. For example, the preset point dot1 may be a silver adhesive point, which may cause the silver adhesive point to be electrically connected to the color film polarizer 2112 by coating silver adhesive at the silver adhesive point on the array substrate 2113. Correspondingly, the preset point dot2 shown in FIG. 2A may also be disposed at a position away from the array polarizer 2114 in the array substrate 2113. At the preset point dot2, the preset point dot2 is electrically connected to the color film polarizer 2112. For example, the preset point dot2 may be a silver adhesive point, which may cause the silver adhesive point to be electrically connected to the color film polarizer 2112 by coating silver adhesive at the silver adhesive point on the array substrate 2113. The preset points dot1 and dot2 may also be electrically connected to the color film polarizer 2112 through other conductive colloids.

The color film polarizer 2112 and the array substrate 2113 are electrically connected to each other through the silver adhesive 2115 at two silver adhesive points, and the array substrate 2113 is electrically connected to the driving circuit 220, so as to form a closed anti-static ring R1. A loop of the anti-static ring R1 may be the driving circuit 220→the array substrate 2113→the preset point dot1→the color film polarizer 2112→the preset point dot2→the array substrate 2113→the driving circuit 220. The preset point dot1 and the preset point dot2 are electrically connected to each other through the color film polarizer 2112.

Figure 2C:
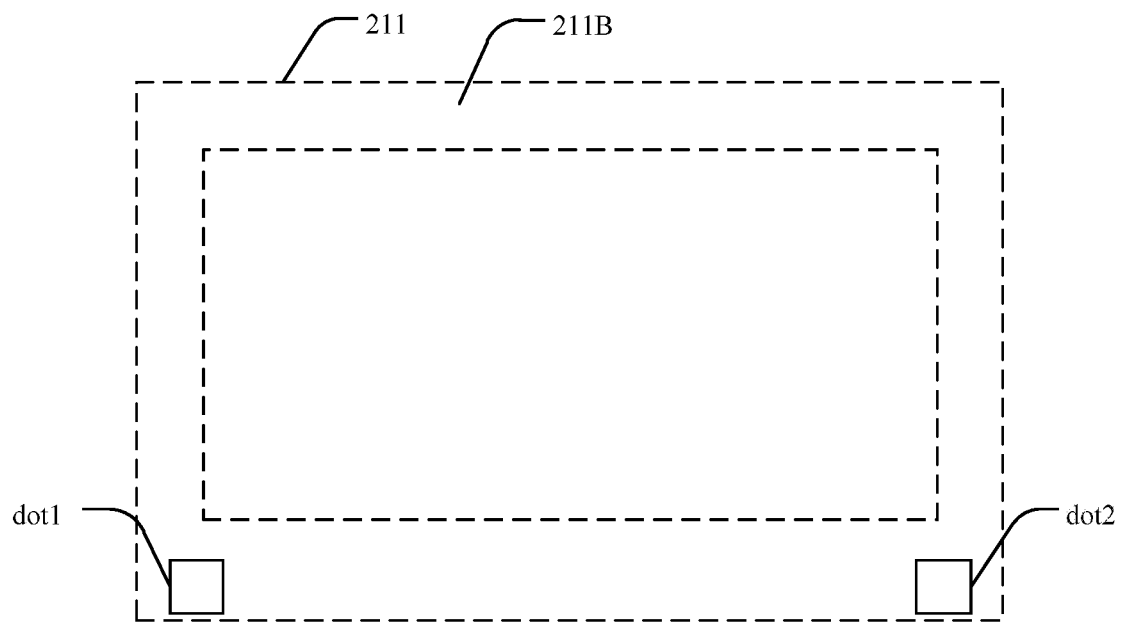
FIG. 2C to FIG. 2D show schematic diagrams of preset points in the display substrate according to the embodiment of the present disclosure.
Figure 2D:
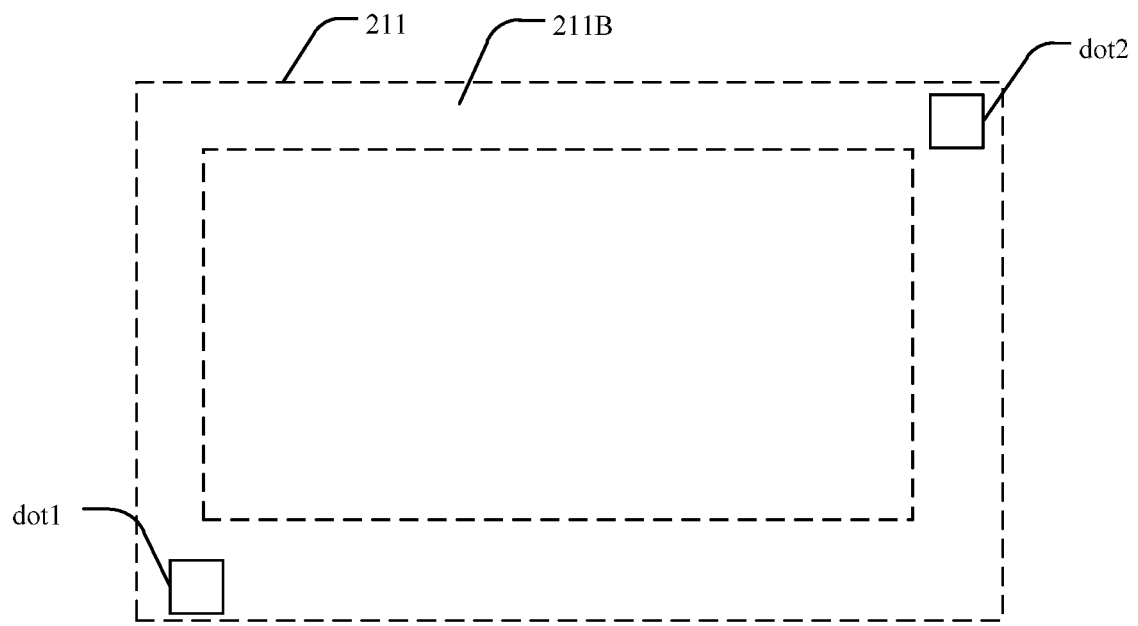

FIG. 2C to FIG. 2D show schematic diagrams of preset points in the display panel according to the embodiment of the present disclosure. The present disclosure does not limit a number of preset points disposed on the display panel, and a positional relationship between each two of the plurality of preset points is not limited. The embodiment of the present disclosure provides only an exemplary explanation of sizes and positions of the preset points by disposing two preset points in the display substrate. In the embodiment of the present disclosure, the two preset points may be disposed symmetrically with respect to the driving circuit 120. Therefore, this embodiment provides only an exemplary explanation of a size and position of one of the preset points. In addition, the positional relationships described in the embodiment of the present disclosure, such as "up", "down", "left", "right", "top", and "bottom", are only those shown in the figures and do not limit the positional relationships of the preset points in actual display substrate products. It should be noted that the preset points are disposed in the non-display region of the display substrate. Those of ordinary skill in the art may dispose preset points at corresponding positions in the display substrate according to wiring requirements in the display substrate.

For example, at least two preset points may be located on a first side of the non-display region, and the first side is close to the driving circuit. FIG. 2C schematically shows position information of two preset points. As shown in FIG. 2C, two preset points may be disposed on a same side of the non-display region 211B. For example, the preset point dot1 and the preset point dot2 may be disposed on the first side of the non-display region 211B, and the first side may be a side close to the driving circuit 220.

For example, at least two preset points include at least one first preset point and at least one second preset point. At least one first preset point is located on the first side of the non-display region, at least one second preset point is located on a second side of the non-display region opposite to the first side of the non-display region, the first side is close to the driving circuit, and the second side is away from the driving circuit. FIG. 2D schematically shows position information of two preset points. As shown in FIG. 2D, the preset point dot1 and the preset point dot2 may also be respectively disposed on different sides of the non-display region 211B. For example, two preset points are respectively disposed at two opposite corners of the non-display region 211B, the preset point dot1 may be disposed on the first side of the non-display region, the preset point dot2 may be disposed on the second side of the non-display region, the first side is close to the driving circuit 220, and the second side is away from the driving circuit 220.

For example, for an 11.6 inch display panel, the preset point may be a rectangle of a length of 2000 μm and a width of 1800 μm. The preset point may be disposed at a position of a distance of 1150 μm from a bottom of the display panel and a distance of 2700 μm from a right side of the display panel. At this time, a top of the preset point is close to a signal line connected to the display substrate.

For example, for a 10.9 inch display panel, the preset point may be a rectangle of a length of 2000 μm and a width of 1800 μm. The preset point may be disposed at a position of a distance of 950 μm from the bottom of the display panel and a distance of 5100 μm from the right side of the display panel. At this time, the top of the preset point is close to a signal line connected to the display panel.

For example, for a 10.95 inch display panel, the preset point may be a rectangle of a length of 2000 μm and a width of 1795 μm. The preset point may be disposed at a position of a distance of 1360 μm from the bottom of the display panel, a distance of 2600 μm from the right side of the display panel and a distance of 3830 μm from the driving circuit. At this time, a distance between the top of the preset point and the signal line is 280 μm.

Figure 3A:
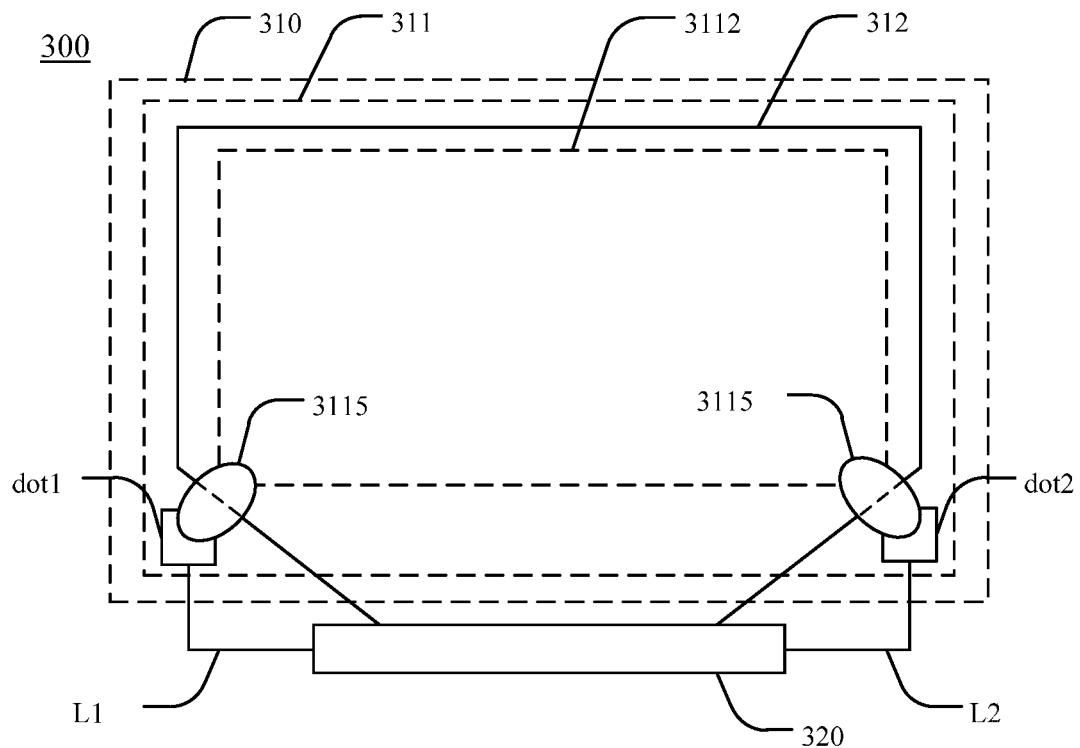
FIG. 3A shows a schematic diagram of a structure of a display device according to another embodiment of the present disclosure.

FIG. 3A shows a schematic diagram of a structure of a display device according to another embodiment of the present disclosure. FIG. 3A exemplarily shows only two preset points and one grounding line. As shown in FIG. 3A, the display device 300 includes a display panel 310 and a driving circuit 320. The display panel 310 is driven by the driving circuit 320, and is electrically connected to the driving circuit 320. The display panel 310 includes a display substrate 311 and a grounding line 312, and the display substrate 311 includes a color film polarizer 3112. A preset point dot1 and a preset point dot2 are disposed on the display substrate 311. The preset point dot1 and the preset point dot2 are respectively electrically connected to the color film polarizer 3112 through a silver adhesive 3115. The preset point dot1 and the preset point dot2 are also connected to the driving circuit 320, so as to form an anti-static ring R1. A loop of the anti-static ring R1 may be the driving circuit 320→the preset point dot1→the color film polarizer 3112→the preset point dot2→the driving circuit 320.

The grounding line 312 is electrically connected to the driving circuit 320 in the non-display region of the display substrate 311, so as to form an anti-static ring R2 surrounding the display region of the display substrate 311. It should be noted that the grounding line 312 is not connected to the silver adhesive 3115. The non-display region of the display substrate 311 may be provided with a plurality of grounding lines 312. For example, the plurality of grounding lines 312 are electrically connected to the driving circuit 320, so as to form a closed anti-static ring R2. The two grounding lines of the plurality of grounding lines 312 are electrically connected to the driving circuit 320, so as to form two closed anti-static rings R2. A loop of the anti-static ring R2 may be the driving circuit 320→the grounding line 312→the driving circuit 320.

Figure 3B:
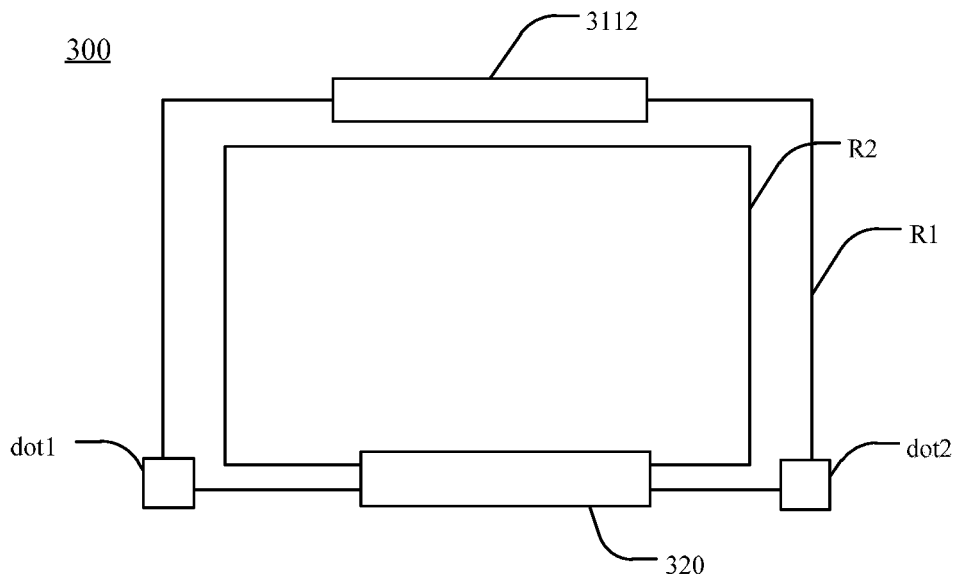
FIG. 3B shows a schematic diagram of a structure of a display device according to another embodiment of the present disclosure.

FIG. 3B shows a schematic diagram of a structure of a display device according to another embodiment of the present disclosure. As shown in FIG. 3B, in the display device 300, the color film polarizer 3112 is electrically connected to the driving circuit 320 through the preset point dot1 and the preset point dot2, so as to form an anti-static ring R1. A loop of the anti-static ring R1 may be the driving circuit 320→the preset point dot1→the color film polarizer 3112→the preset point dot2→the driving circuit 320. The grounding line 312 is directly connected to the driving circuit 320, so as to form an anti-static ring R2. A loop of the anti-static ring R2 may be the driving circuit 320→the grounding line 312→the driving circuit 320. The anti-static ring R2 is not electrically connected to the preset points.

The anti-static ring R1 and the anti-static ring R2 are separately electrically connected to the driving circuit 320, and a part of the anti-static ring R1 located in the display panel and a part of the anti-static ring R2 located in the display panel are not connected to each other. The independent anti-static rings may effectively prevent charges from entering interior of the display panel and facilitate discharging of electro-static from different parts. The anti-static ring R2 may prevent charges from entering interior of the display panel, and the anti-static ring R1 uses the preset points, which are disposed on the display substrate, to conduct and discharge charges of surface, which may also prevent static electricity from entering the anti-static ring R2.

For example, the display substrate 311 also includes an array substrate, and the grounding line 312 is electrically connected to the array substrate of the display substrate 311, so as to achieve an electrical connection with the display substrate 311. After the grounding line 312 is electrically connected to the driving circuit 320, an anti-static ring R2 surrounding the display substrate 311 may be formed. The array substrate includes a gate layer and a source layer. At least one grounding line may be disposed in the gate layer and/or the source layer, so as to form at least one anti-static ring R2.

For example, at least one anti-static ring R2 includes an anti-static ring R2. A grounding line may be disposed in the gate layer, so as to form the anti-static ring R2. A grounding line may also be disposed in the source layer, so as to form the anti-static ring R2.

Figure 3C:
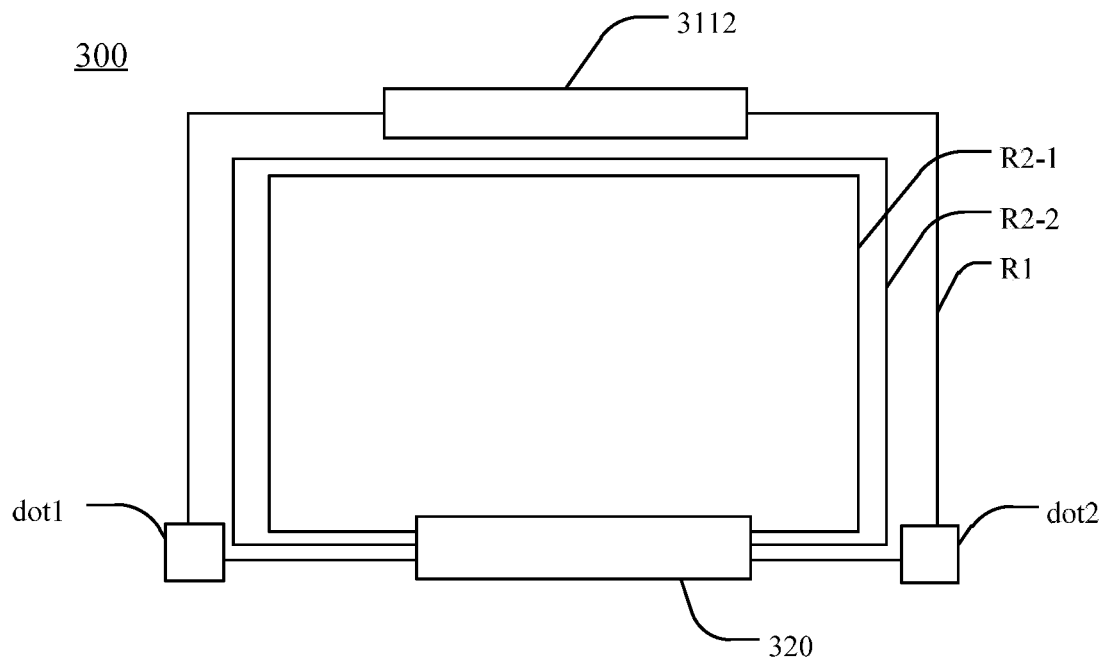
FIG. 3C shows a schematic diagram of a structure of a display device according to another embodiment of the present disclosure.

For example, at least one anti-static ring R2 also includes two anti-static rings R2-1 and R2-2. FIG. 3C shows a schematic diagram of a structure of a display device according to another embodiment of the present disclosure. As shown in FIG. 3C, a grounding line is disposed in the gate layer, so as to form an anti-static ring R2-1. At the same time, a grounding line is disposed in the source layer, so as to form an anti-static ring R2-2.

In the embodiment of the present disclosure, a semiconductor structure of the array substrate may include a source layer, an insulation layer and a gate layer.

For example, in a case of disposing the grounding line in the gate layer to form the anti-static ring R2, two connecting points may be marked in the non-display region of the array substrate, and holes may be drilled at both connecting points to a depth of the gate layer. A conductive adhesive is added into the holes, so that the conductive adhesive is only electrically connected to the gate layer, and the insulation layer may be used to block an electrical connection between the conductive adhesive and the source layer. Then, the two ends of the grounding line are respectively electrically connected to the gate layers of the two connecting points through the conductive adhesive, so as to form the anti-static ring R2.

For example, in a case of disposing the grounding line in the source layer to form the anti-static ring R2, two connecting points may be marked in the non-display region of the array substrate, and holes may be drilled at both connecting points to a depth of the source layer. A conductive adhesive is added into the holes, so that the conductive adhesive is only electrically connected to the source layer, and the insulation layer may be used to block an electrical connection between the conductive adhesive and the gate layer. Then, the two ends of the grounding line are respectively electrically connected to the source layer of the two connecting points through conductive adhesive, so as to form the anti-static ring R2.

For example, in a case that two grounding lines are respectively disposed in the source layer and the gate layer to form two anti-static rings R2, two sets of connecting points may be marked in the non-display region of the array substrate. One set of connecting points includes two connecting points, and holes are drilled at a first set of connecting points to the depth of the source layer, and the conductive adhesive is added into the holes, so that the conductive adhesive is only electrically connected to the source layer. Holes are drilled at a second set of connecting points to the depth of the gate layer, and the conductive adhesive is added into the holes, so that the conductive adhesive is only electrically connected to the gate layer. The first set of connecting points and the second set of connecting points are separated by the insulation layer, so that there is no electrical connection between the two sets of connecting points. Then, the two ends of the grounding lines are respectively connected to the source layer and the gate layer through the conductive adhesive, so as to form two anti-static metal rings R2.

A loop of the anti-static metal ring R2 may be the driving circuit→the grounding line→the gate layer and/or the source layer→the grounding line→the driving circuit.

For example, for the anti-static ring R1, at least two preset points provided on the display substrate 311 may be electrically connected to the driving circuit 320 through the gate layer. At least two preset points disposed on the display substrate 311 may also be electrically connected to the driving circuit 320 through the source layer.

For example, the display panel also includes at least two connecting lines, and at least two preset points are electrically connected to the driving circuit through at least two connecting lines. At least two connecting lines may be disposed in the gate layer of the array substrate or in the source layer of the array substrate. As shown in FIG. 3A, at least two connecting lines include a first connecting line L1 and a second connecting line L2. One end of the first connecting line L1 is electrically connected to the preset point dot1, and the other end of the first connecting line L1 is electrically connected to the driving circuit 320. One end of the second connecting line L2 is electrically connected to the preset point dot2, and the other end of the second connecting line L2 is electrically connected to the driving circuit 320. For example, the gate layer of the array substrate may be performed etching, so as to form a gate connecting line for electrically connecting the preset point to the driving circuit 320. Alternatively, the source layer of the array substrate may be performed etching, so as to form a source connecting line for electrically connecting the preset point to the driving circuit 320.

For example, it is preferable to etch the source connecting line in the source layer, so that the preset point is electrically connected to the driving circuit. The source layer is closer to an upper surface of the display substrate than the gate layer. The source connecting line is etched in the source layer, so as to reduce an etching depth, thereby reducing an impact on other structures of a semiconductor layer of the array substrate.

Figure 4A:
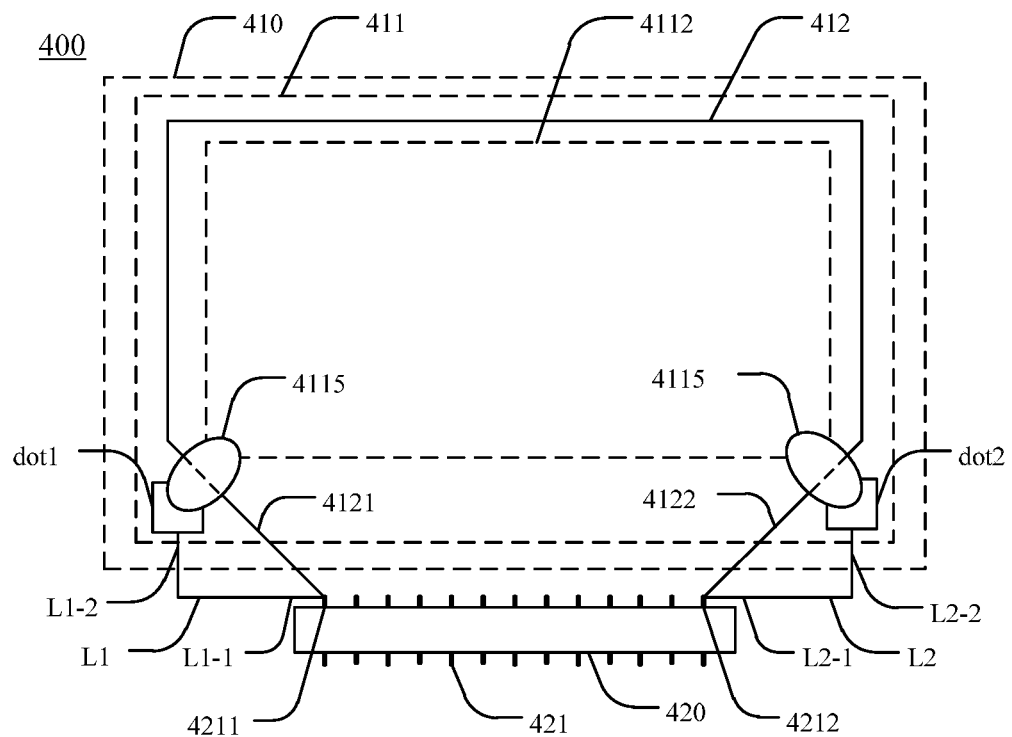
FIG. 4A shows a schematic diagram of a structure of a display device according to another embodiment of the present disclosure.

FIG. 4A shows a schematic diagram of a structure of a display device according to another embodiment of the present disclosure. As shown in FIG. 4A, the display device 400 includes a display panel 410 and a driving circuit 420.

The display panel 410 is driven by a driving circuit 420. The driving circuit 420 includes a plurality of connecting ends 421, and the display panel 410 is electrically connected to the driving circuit 420 through the plurality of connecting ends 421. The display panel 410 includes a display substrate 411 and at least one grounding line 412. At least two preset points dot are disposed on the display substrate 411. At least two preset points dot are electrically connected to at least two connecting ends of the plurality of connecting ends 421, and at least one grounding line is electrically connected to at least two connecting ends of the plurality of connecting ends 421. FIG. 4A exemplarily shows two preset points and a grounding line. At least two connecting ends include a first connecting end 4211 and a second connecting end 4212. At least one grounding line 412 includes a first grounding line 412, the first grounding line 412 includes a first end 4121 and a second end 4122. At least two preset points dot include a first silver adhesive point dot1 and a second silver adhesive point dot2, and at least two connecting lines L include a first connecting line L1 and a second connecting line L2.

As shown in FIG. 4A, the first silver adhesive point dot1 is connected to the first connecting end 4211 through the first connecting line L1, the second silver adhesive point dot2 is electrically connected to the second connecting end 4212 through the second connecting line L2, and the first silver adhesive point dot1 and the second silver adhesive point dot2 are respectively electrically connected to a color film polarizer 4112 through a silver adhesive 4115, so as to form an anti-static ring R1. The first connecting line L1 and the second connecting line L2 may be gate connecting lines or source connecting lines. For example, the first connecting line L1 may include a first end L1-1 and a second end L1-2, a first end L1-1 of the first connecting line L1 is electrically connected to the first connecting end 4211, and a second end L1-2 of the first connecting line L1 is electrically connected to the first silver adhesive dot 1. The second connecting line L2 may include a first end L2-1 and a second end L2-2, the first end L2-1 of the second connecting line L2 is electrically connected to the second connecting end 4212, and the second end L2-2 of the second connecting line L2 is electrically connected to the second silver adhesive point dot2. A loop of the anti-static ring R1 may be the first connecting end 4211→the first connecting line L1→the first silver adhesive point dot1→the color film polarizer 4112→the second silver adhesive point dot2→the connecting line L2→the second connecting end 4212→the first connecting end 4211.

The first end 4121 of the first grounding line 412 is electrically connected to the first connecting end 4211, and the second end 4122 of the first grounding line 412 is electrically connected to the second connecting end 4212, so as to form an anti-static ring R2. A loop of the anti-static ring R2 may be the first connecting end 4211→the first grounding line 412→the second connecting end 4212→the first connecting end 4211.

For example, the first connecting line L1 and the second connecting line L2 are disposed in the gate layer, the first end L1-1 of the first connecting line L1 is electrically connected to the first connecting end 4211, the second end L1-2 of the first connecting line L1 is electrically connected to the color film polarizer 4112, the first end L2-1 of the second connecting line L2 is electrically connected to the second connecting end 4212, and the second end L2-2 of the second connecting line L2 is electrically connected to the color film polarizer 4112, so as to form an anti-static ring R1. The first grounding line 412 is disposed in the gate layer, and the first end 4121 of the first grounding line 412 is electrically connected to the first connecting end 4211. The second end 4122 of the first grounding line 412 is electrically connected to the second connecting end 4212, so as to form an anti-static ring R2.

For example, the first connecting line L1 and the second connecting line L2 are disposed in the source layer, the first end L1-1 of the first connecting line L1 is electrically connected to the first connecting end 4211, the second end L1-2 of the first connecting line L1 is electrically connected to the color film polarizer 4112, the first end L2-1 of the second connecting line L2 is electrically connected to the second connecting end 4212, and the second end L2-2 of the second connecting line L2 is electrically connected to the color film polarizer 4112, so as to form an anti-static ring R1. The first grounding line 412 is disposed in the gate layer, and the first end 4121 of the first grounding line 412 is electrically connected to the first connecting end 4211. The second end 4122 of the first grounding line 412 is electrically connected to the second connecting end 4212, so as to form an anti-static ring R2.

For example, the first connecting line L1 and the second connecting line L2 are disposed in the source layer, the first end L1-1 of the first connecting line L1 is electrically connected to the first connecting end 4211, the second end L1-2 of the first connecting line L1 is electrically connected to the color film polarizer 4112, the first end L2-1 of the second connecting line L2 is electrically connected to the second connecting end 4212, and the second end L2-2 of the second connecting line L2 is electrically connected to the color film polarizer 4112, so as form an anti-static ring R1. The first grounding line 412 is disposed in the source layer, and the first end 4121 of the first grounding line 412 is electrically connected to the first connecting end 4211. The second end 4122 of the first grounding line 412 is electrically connected to the second connecting end 4212, so as to form an anti-static ring R2.

For example, the first connecting line L1 and the second connecting line L2 are disposed in the gate layer, the first end L1-1 of the first connecting line L1 is electrically connected to the first connecting end 4211, the second end L1-2 of the first connecting line L1 is electrically connected to the color film polarizer 4112, the first end L2-1 of the second connecting line L2 is electrically connected to the second connecting end 4212, and the second end L2-2 of the second connecting line L2 is electrically connected to the color film polarizer 4112, so as to form an anti-static ring R1. The first grounding line 412 is disposed in the source layer, and the first end 4121 of the first grounding line 412 is electrically connected to the first connecting end 4211. The second end 4122 of the first grounding line 412 is electrically connected to the second connecting end 4212, so as to form an anti-static ring R2.

The first end 4121 of the first grounding line 412 and the first end L1-1 of the first connecting line L1 may be electrically connected to the first connecting end 4211. The second end 4122 of the first grounding line 412 and the first end L2-1 of the second connecting line L2 may also be electrically connected to the second connecting end 4212. The anti-static ring R1 and the anti-static ring R2 may be electrically connected to a same connecting end of the driving circuit 420, so as to reduce disposing of number of connecting ends.

Figure 4B:
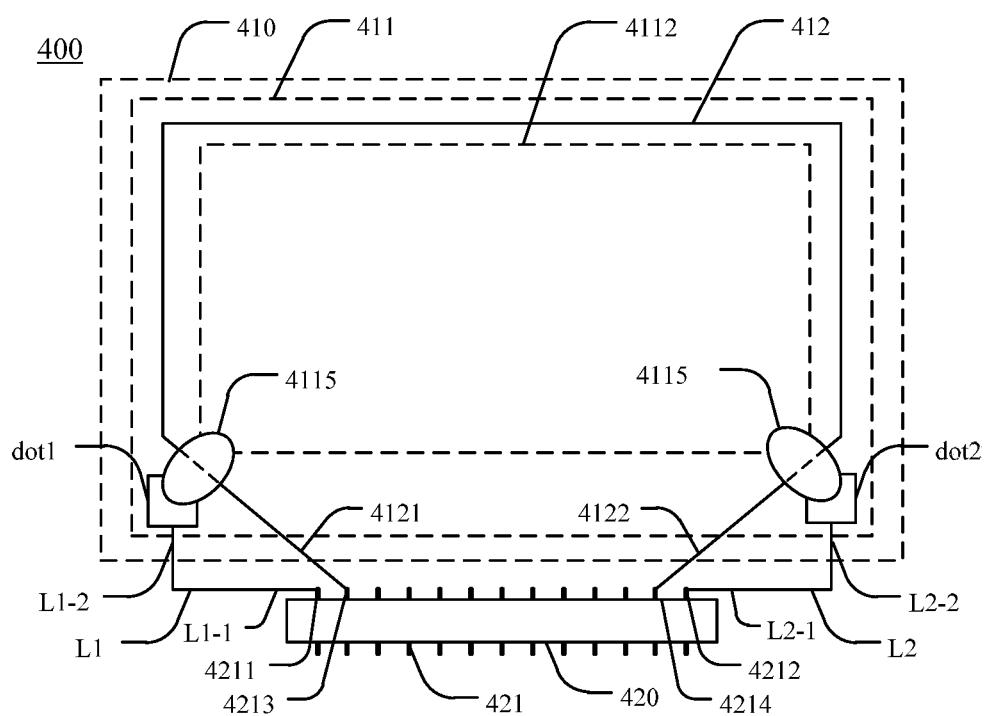
FIG. 4B shows a schematic diagram of a structure of a display device according to another embodiment of the present disclosure.

FIG. 4B shows a schematic diagram of a structure of a display device according to another embodiment of the present disclosure. As shown in FIG. 4B, the display device 400 includes a display panel 410 and a driving circuit 420. The display panel 410 is driven by the driving circuit 420.

The driving circuit 420 includes a plurality of connecting ends 421, and the display panel 410 is electrically connected to the driving circuit 420 through the plurality of connecting ends 421. The display panel 410 includes a display substrate 411 and at least one grounding line 412. At least two preset dot points are disposed on the display substrate 411. At least two preset points dot are electrically connected to at least two connecting ends of the plurality of connecting ends 421, and at least one grounding line 412 is electrically connected to at least two connecting ends of the plurality of connecting ends 421. At least two connecting ends 421 also include a first connecting end 4211, a second connecting end 4212, a third connecting end 4213 and a fourth connecting end 4214, at least one grounding line 412 includes a first grounding line 412, the first grounding line 412 includes a first end 4121 and a second end 4122, at least two preset points include a first silver adhesive point dot1 and a second silver adhesive point dot2, and at least two connecting lines include a first connecting line L1 and a second connecting line L2.

As shown in FIG. 4B, the first silver adhesive point dot1 is electrically connected to the first connecting end 4211 through the first connecting line L1, the second silver adhesive point dot2 is electrically connected to the second connecting end 4212 through the second connecting line L2, and the first silver adhesive point dot1 and the second silver adhesive point dot2 are respectively electrically connected to a color film polarizer 4112 through a silver adhesive 4115, so as to form an anti-static ring R1. The first connecting line L1 and the second connecting line L2 may be gate connecting lines or source connecting lines. For example, the first connecting line L1 may include a first end L1-1 and a second end L1-2, the first end L1-1 of the first connecting line L1 is electrically connected to the first connecting end 4211, and the second end L1-2 of the first connecting line L1 is electrically connected to the first silver adhesive dot 1. The second connecting line L2 may include a first end L2-1 and a second end L2-2, the first end L2-1 of the second connecting line L2 is electrically connected to the second connecting end 4212, and the second end L2-2 of the second connecting line L2 is electrically connected to the second silver adhesive point dot2. A loop of the anti-static ring R1 may be the first connecting end 4211→the first connecting line L1→the first silver adhesive point dot1→the color film polarizer 4112→the second silver adhesive point dot2→the second connecting line L2→the second connecting end 4212→the first connecting end 4211.

The first end 4121 of the first grounding line 412 is electrically connected to a third connecting end 4213, and the second end 4122 of the first grounding line 412 is electrically connected to a fourth connecting end 4214, so as to form an anti-static ring R2. A loop of the anti-static ring R2 may be the third connecting end 4213→the first grounding line 412→the fourth connecting end 4214→the third connecting end 4213.

The first end 4121 of the first grounding line 412 and the first end L1-1 of the first connecting line L1 may be electrically connected to different connecting ends. The second end 4122 of the first grounding line 412 and the first end L2-1 of the second connecting line L2 may be electrically connected to different connecting ends. The anti-static ring R1 and the anti-static ring R2 may be electrically connected to different connecting ends of the driving circuit 420.

For example, the first connecting line L1 and the second connecting line L2 are disposed in the gate layer, the first end L1-1 of the first connecting line L1 is electrically connected to the first connecting end 4211, the second end L1-2 of the first connecting line L1 is electrically connected to the color film polarizer 4112, the first end L2-1 of the second connecting line L2 is electrically connected to the second connecting end 4212, and the second end L2-2 of the second connecting line L2 is electrically connected to the color film polarizer 4112, so as to form an anti-static ring R1. The first grounding line 412 is disposed in the gate layer, and the first end 4121 of the first grounding line 412 is electrically connected to the third connecting end 4213. The second end 4122 of the first grounding line 412 is electrically connected to the fourth connecting end 4214, so as to form an anti-static ring R2.

For example, the first connecting line L1 and the second connecting line L2 are disposed in the source layer, the first end L1-1 of the first connecting line L1 is electrically connected to the first connecting end 4211, the second end L1-2 of the first connecting line L1 is electrically connected to the color film polarizer 4112, the first end L2-1 of the second connecting line L2 is electrically connected to the second connecting end 4212, and the second end L2-2 of the second connecting line L2 is electrically connected to the color film polarizer 4112, so as to form an anti-static ring R1. The first grounding line 412 is disposed in the source layer, and the first end 4121 of the first grounding line 412 is electrically connected to the third connecting end 4213. The second end 4122 of the first grounding line 412 is electrically connected to the fourth connecting end 4214, so as to form an anti-static ring R2.

For example, the first connecting line L1 and the second connecting line L2 are disposed in the source layer, the first end L1-1 of the first connecting line L1 is electrically connected to the first connecting end 4211, the second end L1-2 of the first connecting line L1 is electrically connected to the color film polarizer 4112, the first end L2-1 of the second connecting line L2 is electrically connected to the second connecting end 4212, and the second end L2-2 of the second connecting line L2 is electrically connected to the color film polarizer 4112, so as to form an anti-static ring R1. The first grounding line 412 is disposed in the gate layer, and the first end 4121 of the first grounding line 412 is electrically connected to the third connecting end 4213. The second end 4122 of the first grounding line 412 is electrically connected to the fourth connecting end 4214, so as to form an anti-static ring R2.

For example, the first connecting line L1 and the second connecting line L2 are disposed in the gate layer, the first end L1-1 of the first connecting line L1 is electrically connected to the first connecting end 4211, the second end L1-2 of the first connecting line L1 is electrically connected to the color film polarizer 4112, the first end L2-1 of the second connecting line L2 is electrically connected to the second connecting end 4212, and the second end L2-2 of the second connecting line L2 is electrically connected to the color film polarizer 4112, so as to form an anti-static ring R1. The first grounding line 412 is disposed in the source layer, and the first end 4121 of the first grounding line 412 is electrically connected to the third connecting end 4213. The second end 4122 of the first grounding line 412 is electrically connected to the fourth connecting end 4214, so as to form an anti-static ring R2.

In the embodiment of the present disclosure, in a case that at least one grounding line includes two grounding lines, the two grounding lines may be electrically connected to a same connecting end. Alternatively, two grounding lines may also be electrically connected to different connecting ends.

The present disclosure schematically provides an embodiment of an electrical connection relationship between two grounding lines and connecting ends of the driving circuit. At least one grounding line may include a first grounding line and a second grounding line. The first grounding line includes a first end and a second end. The second grounding line includes a third end and a fourth end. At least two connecting ends may include a first connecting end, a second connecting end, a third connecting end, a fourth connecting end, a fifth connecting end and a sixth connecting end.

In the embodiment of the present disclosure, the first silver adhesive point may be electrically connected to a same connecting end through the first connecting line, the first end of the first grounding line and the third end of the second grounding line. The second silver adhesive point may be electrically connected to a connecting same end through the second connecting line, the second end of the first grounding line and the fourth end of the second grounding line.

For example, the first connecting line and the second connecting line are disposed in the gate layer, the first end of the first connecting line is electrically connected to the first connecting end, the second end of the first connecting line is electrically connected to the color film polarizer, the first end of the second connecting line is electrically connected to the second connecting end, and the second end of the second connecting line is electrically connected to the color film polarizer, so as to form an anti-static ring R1. The first grounding line is disposed in the gate layer, the first end of the first grounding line is electrically connected to the first connecting end, and the second end of the first grounding line is electrically connected to the second connecting end, so as to form an anti-static ring R2-1. The second grounding line is disposed in the source layer, the third end of the second grounding line is electrically connected to the first connecting end, and the fourth end of the second grounding line is electrically connected to the second connecting end, so as to form an anti-static ring R2-2.

For example, the first connecting line and the second connecting line are disposed in the source layer, the first end of the first connecting line is electrically connected to the first connecting end, the second end of the first connecting line is electrically connected to the color film polarizer, the first end of the second connecting line is electrically connected to the second connecting end, and the second end of the second connecting line is electrically connected to the color film polarizer, so as to form an anti-static ring R1. The first grounding line is disposed in the gate layer, the first end of the first grounding line is electrically connected to the first connecting end, and the second end of the first grounding line is electrically connected to the second connecting end, so as to form an anti-static ring R2-1. The second grounding line is disposed in the source layer, the third end of the second grounding line is electrically connected to the first connecting end, and the fourth end of the second grounding line is electrically connected to the second connecting end, so as to form an anti-static ring R2-2.

In the embodiment of the present disclosure, the first end of the first connecting line, the first end of the first grounding line, and the third end of the second grounding line may be electrically connected to different connecting ends. The first end of the second connecting line, the second end of the first grounding line, and the fourth end of the second grounding line may be electrically connected to different connecting ends.

For example, the first connecting line and the second connecting line are disposed in the gate layer, the first end of the first connecting line is electrically connected to the first connecting end, the second end of the first connecting line is electrically connected to the color film polarizer, the first end of the second connecting line is electrically connected to the second connecting end, and the second end of the second connecting line is electrically connected to the color film polarizer, so as to form an anti-static ring R1. The first grounding line is disposed in the gate layer, the first end of the first grounding line is electrically connected to the third connecting end, and the second end of the first grounding line is electrically connected to the fourth connecting end, so as to form an anti-static ring R2-1. The second grounding line is disposed in the source layer, the third end of the second grounding line is electrically connected to the fifth connecting end, and the fourth end of the second grounding line electrically connected to the sixth connecting end, so as to form an anti-static ring R2-2.

For example, the first connecting line and the second connecting line are disposed in the source layer, the first end of the first connecting line is electrically connected to the first connecting end, the second end of the first connecting line is electrically connected to the color film polarizer, the first end of the second connecting line is electrically connected to the second connecting end, and the second end of the second connecting line is electrically connected to the color film polarizer, so as to form an anti-static ring R1. The first grounding line is disposed in the source layer, the first end of the first grounding line is electrically connected to the third connecting end, and the second end of the first grounding line is electrically connected to the fourth connecting end, so as to form an anti-static ring R2-1. The second grounding line is disposed in the gate layer, the third end of the second grounding line is electrically connected to the fifth connecting end, and the fourth end of the second grounding line is electrically connected to the sixth connecting end, so as to form an anti-static ring R2-2.

In the embodiment of the present disclosure, only any two of the first end of the first connecting line, the first end of the first grounding line, and the third end of the second grounding line are electrically connected to a same connecting end. Only any two of the first end of the second connecting line, the second end of the first grounding line, and the fourth end of the second grounding line may be electrically connected to a same connecting end.

For example, the first connecting line and the second connecting line are disposed in the gate layer, the first end of the first connecting line is electrically connected to the first connecting end, the second end of the first connecting line is electrically connected to the color film polarizer, the first end of the second connecting line is electrically connected to the second connecting end, and the second end of the second connecting line is electrically connected to the color film polarizer, so as to form an anti-static ring R1. The first grounding line is disposed in the gate layer, the first end of the first grounding line is electrically connected to the first connecting end, and the second end of the first grounding line is electrically connected to the second connecting end, so as to form an anti-static ring R2-1. The second grounding line is disposed in the source layer, the third end of the second grounding line is electrically connected to the third connecting end, and the fourth end of the second grounding line is electrically connected to the fourth connecting end, so as to form an anti-static ring R2-2.

For example, the first connecting line and the second connecting line are disposed in the gate layer, the first end of the first connecting line is electrically connected to the first connecting end, the second end of the first connecting line is electrically connected to the color film polarizer, the first end of the second connecting line is electrically connected to the second connecting end, and the second end of the second connecting line is electrically connected to the color film polarizer, so as to form an anti-static ring R1. The first grounding line is disposed in the gate layer, the first end of the first grounding line is electrically connected to the third connecting end, and the second end of the first grounding line is electrically connected to the fourth connecting end, so as to form an anti-static ring R2-1. The second grounding line is disposed in the source layer, the third end of the second grounding line is electrically connected to the third connecting end, and the fourth end of the second grounding line is electrically connected to the fourth connecting end, so as to form an anti-static ring R2-2.

For example, the first connecting line and the second connecting line are disposed in the source layer, the first end of the first connecting line is electrically connected to the first connecting end, the second end of the first connecting line is electrically connected to the color film polarizer, the first end of the second connecting line is electrically connected to the second connecting end, and the second end of the second connecting line is electrically connected to the color film polarizer, so as to form an anti-static ring R1. The first grounding line is disposed in the gate layer, the first end of the first grounding line is electrically connected to the first connecting end, and the second end of the first grounding line is electrically connected to the second connecting end, so as to form an anti-static ring R2-1. The second grounding line is disposed in the source layer, the third end of the second grounding line is electrically connected to the third connecting end, and the fourth end of the second grounding line is electrically connected to the fourth connecting end, so as to form an anti-static ring R2-2.

For example, the first connecting line and the second connecting line are disposed in the source layer, the first end of the first connecting line is electrically connected to the first connecting end, the second end of the first connecting line is electrically connected to the color film polarizer, the first end of the second connecting line is electrically connected to the second connecting end, and the second end of the second connecting line is electrically connected to the color film polarizer, so as to form an anti-static ring R1. The first grounding line is disposed in the source layer, the first end of the first grounding line is electrically connected to the first connecting end, and the second end of the first grounding line is electrically connected to the second connecting end, so as to form an anti-static ring R2-1. The second grounding line is disposed in the gate layer, the third end of the second grounding line electrically connected to the third connecting end, and the fourth end of the second grounding line electrically connected to the fourth connecting end, so as to form an anti-static ring R2-2.

For example, the first connecting line and the second connecting line are disposed in the source layer, the first end of the first connecting line is electrically connected to the first connecting end, the second end of the first connecting line is electrically connected to the color film polarizer, the first end of the second connecting line is electrically connected to the second connecting end, and the second end of the second connecting line is electrically connected to the color film polarizer, so as to form an anti-static ring R1. The first grounding line is disposed in the source layer, the first end of the first grounding line is electrically connected to the third connecting end, and the second end of the first grounding line is electrically connected to the fourth connecting end, so as to form an anti-static ring R2-1. The second grounding line is disposed in the gate layer, the third end of the second grounding line electrically connected to the third connecting end, and the fourth end of the second grounding line electrically connected to the fourth connecting end, so as to form an anti-static ring R2-2.

For example, the first connecting line and the second connecting line are disposed in the gate layer, the first end of the first connecting line is electrically connected to the first connecting end, the second end of the first connecting line is electrically connected to the color film polarizer, the first end of the second connecting line is electrically connected to the second connecting end, and the second end of the second connecting line is electrically connected to the color film polarizer, so as to form an anti-static ring R1. The first grounding line is disposed in the source layer, the first end of the first grounding line is electrically connected to the first connecting end, and the second end of the first grounding line is electrically connected to the second connecting end, so as to form an anti-static ring R2-1. The second grounding line is disposed in the gate layer, the third end of the second grounding line is electrically connected to the third connecting end, and the fourth end of the second grounding line electrically connected to the fourth connecting end, so as to form an anti-static ring R2-2.

In the embodiment of the present disclosure, the first connecting end may include at least one connecting end, and the second connecting end may include at least one connecting end. The third connecting end may include at least one connecting end, and the fourth connecting end may include at least one connecting end. The fifth connecting end may include at least one connecting end, and the sixth connecting end may include at least one connecting end.

Figure 4C:
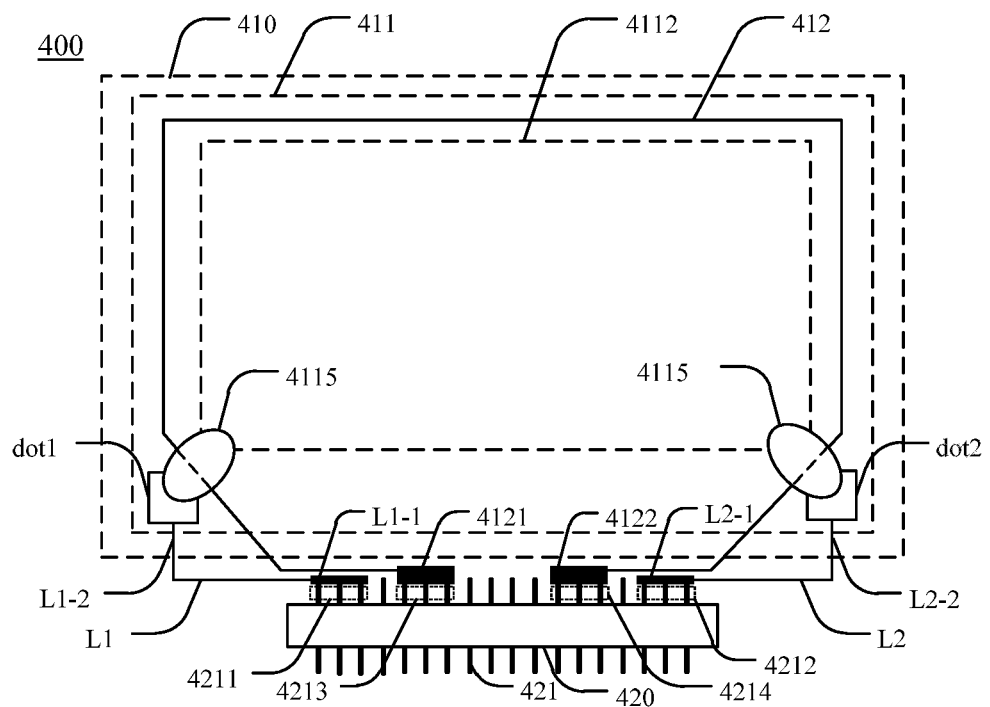
FIG. 4C shows a schematic diagram of a structure of a display device according to another embodiment of the present disclosure.

FIG. 4C shows a schematic diagram of a structure of a display device according to another embodiment of the present disclosure. As shown in FIG. 4C, a first connecting end 4211 includes three connecting ends, and a second connecting end 4212 includes three connecting ends. A third connecting end 4213 includes three connecting ends, and a fourth connecting end 4214 includes three connecting ends. A first end L1-1 of a first connecting line L1 is electrically connected to the three connecting ends of the first connecting end 4211 simultaneously. A first end L2-1 of the second connecting line L2 is electrically connected to the three connecting ends of the second connecting end 4212 simultaneously. The first end 4121 of the first grounding line 412 is electrically connected to the three connecting ends of the third connecting end 4213 simultaneously, and the second end 4122 of the first grounding line 412 is electrically connected to the three connecting ends of the fourth connecting end 4214 simultaneously.

It should be noted that two ends of the anti-static ring R1 and two ends of the anti-static ring R2 may be electrically connected to a same connecting end or to different connecting ends. For two ends of a same anti-static ring, it is required that the two ends of the same anti-static ring are electrically connected to different connecting ends.

In an embodiment of the present disclosure, the display panel may be a touch display panel. The touch display panel includes a touch electrode disposed between the array substrate and the color film substrate.

For example, the touch electrode may be a self-capacitor touch electrode or a mutual capacitor touch electrode.

In a case that the touch electrode is a self-capacitor touch electrode, the self-capacitor touch electrode may be disposed on a side of the array substrate facing the color film substrate, or on a side of the color film substrate facing the array substrate. In a case that the touch electrode is a mutual capacitor touch electrode, the touch electrode includes a driving electrode and an induction electrode. The driving electrode and the induction electrode may be disposed on a side of the array substrate facing the color film substrate. The driving electrode and the induction electrode may also be disposed on a side of the color film substrate facing the array substrate. The driving electrode may also be disposed on a side of the array substrate facing the color film substrate, and the induction electrode may also be disposed on a side of the color film substrate facing the array substrate.

The present disclosure provides a display device, which includes a display panel and a driving circuit according to an embodiment of the present disclosure. The display panel is electrically connected to a driving circuit.

For example, the driving circuit may include a driving IC, a flexible printed circuit (FPC), and an FPC connector. The driving IC may be integrated on the FPC, and the display panel is electrically connected to the FPC through the FPC connector. The FPC connector includes a plurality of pins, which are implemented as a plurality of connecting ends for display panel connections in the driving circuit.

The flowchart and block diagram in the accompanying drawings illustrate possible architectures, functions, and operations of systems, methods, and computer program products according to various embodiments of the present disclosure. At this point, each box in a flowchart or block diagram may represent a module sub-circuit, program segment, or part of code that contains one or more executable instructions for implementing specified logical functions. It should also be noted that in some alternative implementations, the functions indicated in the boxes may also occur in a different order than those indicated in the accompanying drawings. For example, two consecutive boxes may actually be executed in parallel, and sometimes they may also be executed in the opposite order, depending on the function involved. It should also be noted that each box in the block diagram or flowchart, and combinations of boxes in the block diagram or flowchart, may be implemented using dedicated hardware based systems that perform specified functions or operations, or may be implemented using combinations of dedicated hardware and computer instructions.

Those of ordinary skilled in the art may understand that the features recorded in various embodiments and/or claims of the present disclosure may be combined and/or integrated in multiple ways, even if such combinations or integrations are not explicitly recorded in the present disclosure. Specifically, without departing from the spirit and teachings of the present disclosure, the features recorded in various embodiments and/or claims of the present disclosure may be combined and/or integrated in various ways. All these combinations and/or integrations fall within the scope of the present disclosure.

The embodiments of the present disclosure are described above. However, these embodiments are only for illustrative purposes and are not intended to limit the scope of the present disclosure. Although the various embodiments have been described separately above, this does not mean that the measures in the various embodiments may not be advantageously used in combination. The scope of the present disclosure is defined by the appended claims and their equivalents. Without departing from the scope of the present disclosure, those of ordinary skilled in the art may make various substitutions and modifications, all of which should fall within the scope of the present disclosure.

What is claimed is:

1. A display panel, wherein the display panel is electrically connected to a driving circuit, the driving circuit is configured to drive the display panel, and the display panel comprises:
    a display substrate, wherein the display substrate comprises a color film substrate and an array substrate, a surface of the color film substrate away from the array substrate is provided with a color film polarizer, at least two preset points are provided on the display substrate, the at least two preset points are electrically connected to the color film polarizer, and the at least two preset points are electrically connected to the driving circuit, so as to form at least one first anti-static ring; and
    at least one grounding line, wherein the at least one grounding line is electrically connected to the array substrate, and electrically connected to the driving circuit, so as to form at least one second anti-static ring surrounding the display substrate.

2. The display panel of claim 1, further comprising at least two connecting lines, wherein the at least two preset points are respectively electrically connected to the driving circuit through the at least two connecting lines.

3. The display panel of claim 2, wherein the array substrate comprises a gate layer, and the at least two connecting lines are disposed in the gate layer.

4. The display panel of claim 2, wherein the array substrate comprises a source layer, and the at least two connecting lines are disposed in the source layer.

5. The display panel of claim 1, wherein the at least one grounding line comprises a grounding line, the array substrate comprises a gate layer, and the grounding line is disposed in the gate layer.

6. The display panel of claim 1, wherein the at least one grounding line comprises a grounding line, the array substrate comprises a source layer, and the grounding line is disposed in the source layer.

7. The display panel of claim 1, wherein the at least one grounding line comprises two grounding lines, the array substrate comprises a gate layer and a source layer, and the two grounding lines are respectively disposed in the gate layer and the source layer.

8. The display panel of claim 2, wherein the driving circuit comprises a plurality of connecting ends, the at least two preset points are electrically connected to at least two connecting ends of the plurality of connecting ends, and the at least one grounding line is electrically connected to at least two connecting ends of the plurality of connecting ends.

9. The display panel of claim 8, wherein the at least two connecting ends comprise a first connecting end and a second connecting end, the at least one grounding line comprises a first grounding line, the first grounding line comprises a first end and a second end, the at least two connecting lines comprise a first connecting line and a second connecting line, and the array substrate comprises a gate layer;
    the first connecting line and the second connecting line are disposed in the gate layer, the first connecting line is electrically connected to the first connecting end, and the second connecting line is electrically connected to the second connecting end, so as to form a first antistatic ring,
    the first grounding line is disposed in the gate layer, the first end is electrically connected to the first connecting end, and the second end is electrically connected to the second connecting end, so as to form a second antistatic ring.

10. The display panel of claim 9, wherein the at least one grounding line further comprises a second grounding line, the second grounding line comprises a third end and a fourth end, and the array substrate further comprises a source layer;

the second grounding line is disposed in the source layer, the third end is electrically connected to the first connecting end, and the fourth end is electrically connected to the second connecting end, so as to form a second anti-static ring.

11. The display panel of claim 8, wherein the at least two connecting ends comprise a first connecting end, a second connecting end, a third connecting end and a fourth connecting end, the at least one grounding line comprises a first grounding line, the first grounding line comprises a first end and a second end, the two connecting lines comprise a first connecting line and a second connecting line, and the array substrate comprises a gate layer;

the first connecting line and the second connecting line are disposed in the gate layer, the first connecting line is electrically connected to the first connecting end, and the second connecting line is electrically connected to the second connecting end, so as to form a first anti-static ring, the first grounding line is disposed in the gate layer, the first end is electrically connected to the third connecting end, and the second end is electrically connected to the fourth connecting end, so as to form a second anti-static ring.

12. The display panel of claim 11, wherein the at least two connecting ends further comprise a fifth connecting end and a sixth connecting end, the at least one grounding line further comprises a second grounding line, the second grounding line comprises a third end and a fourth end, and the array substrate further comprises a source layer;

the second grounding line is disposed in the source layer, the third end is electrically connected to the fifth connecting end, and the fourth end is electrically connected to the sixth connecting end, so as to form a second anti-static ring.

13. The display panel of claim 8, wherein the at least two connecting ends comprise a first connecting end and a second connecting end, the at least one grounding line comprises a first grounding line, the first grounding line comprises a first end and a second end, the at least two connecting lines comprise a first connecting line and a second connecting line, and the array substrate comprises a gate layer and a source layer;

the first connecting line and the second connecting line are disposed in the source layer, the first connecting line is electrically connected to the first connecting end, and the second connecting line is electrically connected to the second connecting end, so as to form a first anti-static ring, the first grounding line is disposed in the gate layer, the first end is electrically connected to the first connecting end, and the second end is electrically connected to the second connecting end, so as to form a second anti-static ring, wherein the at least two connecting ends further comprise a third connecting end and a fourth connecting end, the at least one grounding line further comprises a second grounding line, and the second grounding line comprises a third end and a fourth end;

the second grounding line is disposed in the source layer, the third end is electrically connected to the third connecting end, and the fourth end is electrically connected to the fourth connecting end, so as to form a second anti-static ring.

14. The display panel of claim 8, wherein the at least two connecting ends comprise a first connecting end and a second connecting end, the at least one grounding line comprises a first grounding line, the first grounding line comprises a first end and a second end, the at least two connecting lines comprise a first connecting line and a second connecting line, and the array substrate comprises a source layer;

the first connecting line and the second connecting line are disposed in the source layer, the first connecting line is electrically connected to the first connecting end, and the second connecting line is electrically connected to the second connecting end, so as to form a first anti-static ring, the first grounding line is disposed in the source layer, the first end is electrically connected to the first connecting end, and the second end is electrically connected to the second connecting end, so as to form a second anti-static ring, wherein the at least one grounding line further comprises a second grounding line, the second grounding line comprises a third end and a fourth end, and the array substrate further comprises a gate layer;

the second grounding line is disposed in the gate layer, the third end is electrically connected to the first connecting end, and the fourth end is electrically connected to the second connecting end, so as to form a second anti-static ring.

15. The display panel of claim 8, wherein the at least two connecting ends comprise a first connecting end, a second connecting end, a third connecting end and a fourth connecting end, the at least one grounding line comprises a first grounding line, the first grounding line comprises a first end and a second end, the at least two connecting lines comprise a first connecting line and a second connecting line, and the array substrate comprises a source layer;

the first connecting line and the second connecting line are disposed in the source layer, the first connecting line is electrically connected to the first connecting end, and the second connecting line is electrically connected to the second connecting end, so as to form a first anti-static ring, the first grounding line is disposed in the source layer, the first end is electrically connected to the third connecting end, and the second end is electrically connected to the fourth connecting end, so as to form a second anti-static ring, wherein the at least two connecting ends further comprise a fifth connecting end and a sixth connecting end, the at least one grounding line further comprises a second grounding line, the second grounding line comprises a third end and a fourth end, and the array substrate further comprises a gate layer;

the second grounding line is disposed in the gate layer, the third end is electrically connected to the fifth connecting end, and the fourth end is electrically connected to the sixth connecting end, so as to form a second anti-static ring.

16. The display panel of claim 8, wherein the at least two connecting ends comprise a first connecting end and a second connecting end, the at least one grounding line comprises a first grounding line, the first grounding line comprises a first end and a second end, the at least two connecting lines comprise a first connecting line and a second connecting line, and the array substrate comprises a gate layer and a source layer;

the first connecting line and the second connecting line are disposed in the gate layer, the first connecting line is electrically connected to the first connecting end, and the second connecting line is electrically connected to the second connecting end, so as to form a first anti-static ring, the first grounding line is disposed in the source layer, the first end is electrically connected to the first connecting end, and the second end is electrically connected to the second connecting end, so as to form a second anti-static ring, wherein the at least two connecting ends further comprise a third connecting end and a fourth connecting end, the at least one grounding line further comprises a second grounding line, and the second grounding line comprises a third end and a fourth end;

the second grounding line is disposed in the gate layer, the third end is electrically connected to the third connecting end, and the fourth end is electrically connected to the fourth connecting end, so as to form a second anti-static ring.

17. The display panel of claim 8, wherein the at least two connecting ends comprise a first connecting end, a second connecting end, a third connecting end and a fourth connecting end, the at least one grounding line comprises a first grounding line, the first grounding line comprises a first end and a second end, the at least two connecting lines comprise a first connecting line and a second connecting line, and the array substrate comprises a gate layer and a source layer;

the first connecting line and the second connecting line are disposed in the source layer, the first connecting line is electrically connected to the first connecting end, and the second connecting line is electrically connected to the second connecting end, so as to form a first anti-static ring, the first grounding line is disposed in the gate layer, the first end is electrically connected to the third connecting end, and the second end is electrically connected to the fourth connecting end, so as to form a second anti-static ring, or wherein the at least two connecting ends comprise a first connecting end, a second connecting end, a third connecting end and a fourth connecting end, the at least one grounding line comprises a first grounding line, the first grounding line comprises a first end and a second end, the at least two connecting lines comprise a first connecting line and a second connecting line, and the array substrate comprises a gate layer and a source layer; the first connecting line and the second connecting line are disposed in the gate layer, the first connecting line is electrically connected to the first connecting end, and the second connecting line is electrically connected to the second connecting end, so as to form a first anti-static ring, the first grounding line is disposed in the source layer, the first end is electrically connected to the third connecting end, and the second end is electrically connected to the fourth connecting end, so as to form a second anti-static ring.

18. The display panel of claim 15, wherein the first connecting end comprises at least one connecting end, and the second connecting end comprises at least one connecting end, wherein the third connecting end comprises at least one connecting end, and the fourth connecting end comprises at least one connecting end, wherein the fifth connecting end comprises at least one connecting end, and the sixth connecting end comprises at least one connecting end.

19. The display panel of claim 1, wherein the at least two preset points are electrically connected to the color film polarizer through a conductive adhesive, wherein the conductive adhesive comprises a silver adhesive, wherein the display substrate comprises a display region and a non-display region;

the at least two preset points are disposed in the non-display region, and the at least two preset points are respectively electrically connected to the driving circuit in the non-display region; and the at least one grounding line is electrically connected to the display substrate in the non-display region, so as to form at least one second anti-static ring surrounding the display region, wherein the at least two preset points are located on a first side of the non-display region, and the first side is close to the driving circuit, or wherein the at least two preset points comprise at least one first preset point and at least one second preset point, the at least one first preset point is located on a first side of the non-display region, the at least one second preset point is located on a second side of the non-display region opposite to the first side of the non-display region, the first side is close to the driving circuit, and the second side is away from the driving circuit, wherein the display panel is a touch display panel, comprising a touch electrode disposed between the array substrate and the color film substrate.

20. A display device, comprising:
a display panel of claim 1; and
a driving circuit, wherein the display panel is electrically connected to the driving circuit.

* * * * *